(12) United States Patent
Bastue et al.

(10) Patent No.: US 6,842,239 B2
(45) Date of Patent: Jan. 11, 2005

(54) ALIGNMENT OF MULTI-CHANNEL DIFFRACTIVE WDM DEVICE

(75) Inventors: Jens Bastue, Frederiksberg (DK); Bjarke Rose, Allerod (DK); Chaker Khalfaoui, Lyngby (DK); Keld Theodor, Greve (DK)

(73) Assignee: Ibsen Photonics A/S, Farum (DK)

( * ) Notice: Subject to any disclaimer, the term of this patent is extended or adjusted under 35 U.S.C. 154(b) by 424 days.

(21) Appl. No.: 09/928,159

(22) Filed: Aug. 10, 2001

(65) Prior Publication Data

US 2003/0030793 A1 Feb. 13, 2003

(51) Int. Cl.⁷ .......................... G01B 11/26; G02B 6/26; H04B 17/00; H04B 10/00
(52) U.S. Cl. .......................... 356/153; 385/37; 385/52; 398/34; 398/84; 398/156
(58) Field of Search .......................... 356/153; 385/52, 385/37, 24; 398/34, 84, 131, 156

(56) References Cited

U.S. PATENT DOCUMENTS

| | | | |
|---|---|---|---|
| 4,102,576 A | | 7/1978 | Maeda et al. |
| 5,355,237 A | | 10/1994 | Lange et al. |
| 5,559,597 A | | 9/1996 | Battey et al. |
| 5,917,625 A | | 6/1999 | Ogusu et al. |
| 5,966,483 A | | 10/1999 | Chowdhury |
| 5,998,796 A | | 12/1999 | Liu et al. |
| 6,016,212 A | * | 1/2000 | Durant et al. ............ 398/131 |
| 6,108,471 A | | 8/2000 | Zhang et al. |
| 6,137,933 A | | 10/2000 | Hunter et al. |
| 6,144,487 A | | 11/2000 | Michishita |
| 6,144,783 A | | 11/2000 | Epworth et al. |
| 6,269,203 B1 | | 7/2001 | Davies et al. |
| 6,275,630 B1 | | 8/2001 | Yang et al. |
| 6,449,066 B1 | | 9/2002 | Arns et al. |
| 6,459,831 B1 | | 10/2002 | Cao et al. |
| 2002/0050557 A1 | | 5/2002 | Kuroda et al. |
| 2002/0054289 A1 | | 5/2002 | Thibault et al. |

FOREIGN PATENT DOCUMENTS

| | | |
|---|---|---|
| EP | 1001287 A2 | 5/2000 |
| EP | 1052868 A2 | 11/2000 |
| GB | 2374142 A | 10/2002 |
| WO | WO 01/09656 A1 | 2/2001 |
| WO | WO 01/42825 A1 | 6/2001 |
| WO | WO 02/057814 A2 | 7/2002 |
| WO | WO 02/067475 A2 | 8/2002 |

OTHER PUBLICATIONS

International Search Report for PCT/EP02/08875.
US–2003–0067645–A1, Ibsen et al. filed Aug. 27, 2001, "Wavelength Division Multiplexed Device".
US 2002–0154855A1, Rose et al., filed Feb. 21, 2001, "Wavelength Division Multiplexed Device".
09/790144–"Wavelength Division Multiplexed Device".
Churin et al., "Passband flattening and broadening techniques for high spectral efficiency wavelength demultiplexers", *Electronic letters*, Jan. 7, 1999, vol. 35, No. 1.
International Search Report for PCT/EP02/09295.

* cited by examiner

*Primary Examiner*—Frank G. Font
*Assistant Examiner*—Roy M. Punnoose
(74) *Attorney, Agent, or Firm*—Altera Law Group, LLC

(57) ABSTRACT

A method and apparatus are presented for aligning a diffractive WDM device that includes i) a multi-channel, light handling device having a selected channel spacing and ii) a multi-channel signal input unit. The method includes adjusting a direction of incidence of an optical signal from the input unit on at least a first diffracting element of the WDM device so as to set an actual optical channel spacing at an output region of the WDM device to be approximately equal to the selected channel spacing of the multi-channel, light handling device. In the apparatus, the orientation of the light input unit is adjustable in a direction parallel to a diffraction plane of the diffractive WDM device so as to select an actual channel spacing at the multi-channel, light handling device that is approximately equal to the selected channel spacing.

34 Claims, 11 Drawing Sheets

ALIGNMENT OF MULTI-CHANNEL DIFFRACTIVE WDM DEVICE

FIELD OF THE INVENTION

The present invention is directed generally to a method of aligning an optical system, and in particular to a method of aligning a diffractive device used in WDM applications. The invention is also directed to the device aligned using the method.

BACKGROUND

One of the advantages of optical fiber communication is the potential for large information handling capacity. One approach to increasing the optical bandwidth over which information is transmitted in an optical fiber is to use wavelength division multiplexing (WDM) or dense wavelength division multiplexing (DWDM), where light at several different wavelengths is combined and injected into a fiber, the light at each wavelength typically being independently modulated with information prior to combining with the other wavelengths. After propagation through the fiber, the light is then separated into its different wavelength components before detection.

The International Telecommunications Union (ITU) has set different DWDM standards, that specify the operating wavelengths for the different DWDM components, also known as channels. Under these standards, the separation between adjacent WDM channels is typically a fixed frequency. For example the inter-channel spacing may be 100 GHz or 50 GHz. As used herein, the term WDM includes DWDM.

More information may be transmitted over a fixed bandwidth when the channel separation is smaller, since more channels can fit into the fixed bandwidth. However, it becomes increasingly difficult to multiplex or demultiplex the WDM channels when the frequency separation is smaller. As the pressure for increased fiber information capacity increases, the requirements for optical WDM components that can handle increasing dense multiplexing also increases.

The transmission of a multiple channel signal along a fiber link often introduces wavelength dependent losses or gains, resulting in nonuniform channel power. It is important to be able to monitor the power in different channels using a channel monitor and to reduce the nonuniformities in channel power.

Furthermore, a complex communications network typically does not consist only of point to point links, but includes one or more local loops branching off main trunk fibers. Such local loops permit smaller communities to be attached to the communications network while the trunk fiber passes between major cities. The trunk fiber includes add/drop multiplexers that select one or more channels propagating along the trunk fiber and that add channels to the trunk fiber.

It has been suggested that a MUX/DMUX, a wavelength monitor and an add/drop multiplexer may be based on the use of a diffractive device. The small interchannel spacing in DWDM systems requires, however, that the diffractive device be aligned precisely.

SUMMARY OF THE INVENTION

In view of the alignment problem highlighted in the previous section, there is, therefore, a need to be able to align a diffractive WDM device precisely in order to correctly handle many closely-spaced channels. The method of aligning the device should be as simple and quick as possible, so as to reduce labor costs. The mechanical design of the device should also be simple and should accommodate a simple alignment procedure.

Generally, the present invention relates to a method and apparatus for aligning a diffractive WDM device. One embodiment of the invention is directed to a method of aligning a WDM device that includes i) a multi-channel, light handling device having a selected channel spacing and ii) a multi-channel signal input unit. The method includes adjusting a direction of incidence of an optical signal from the input unit on at least a first diffracting element of the WDM device so as to set an actual optical channel spacing at an output region of the WDM device to be approximately equal to the selected channel spacing of the multi-channel, light handling device.

Another embodiment of the invention is directed to a diffractive WDM device that includes inputting means for inputting light to the diffractive WDM device, and at least a first light diffracting means for diffracting light received from the inputting means. The device also includes multi-channel light handling means for handling a multi-channel signal received from the at least a first light diffracting means, the multi-channel light handling means having a selected channel spacing; and adjusting means for adjusting a direction of incidence of an optical signal from the inputting means on the at least a first diffracting means so as to set an actual optical channel spacing at an output region of the diffractive WDM device to be approximately equal to the selected channel spacing of the multi-channel, light handling means.

Another embodiment of the invention is directed to a diffractive WDM device that includes a light input unit for inputting a multi-channel optical signal, at least one diffracting element, and a multi-channel, light handling device disposed to receive light from the at least one diffracting element, the multi-channel light handling device having a selected channel spacing. The device also includes at least one focusing element to focus light from the at least one diffracting element to the multi-channel, light handling device. An orientation of the light input unit is adjustable in a direction parallel to a diffraction plane of the diffractive WDM device so as to select an actual channel spacing at the multi-channel, light handling device that is approximately equal to the selected channel spacing.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
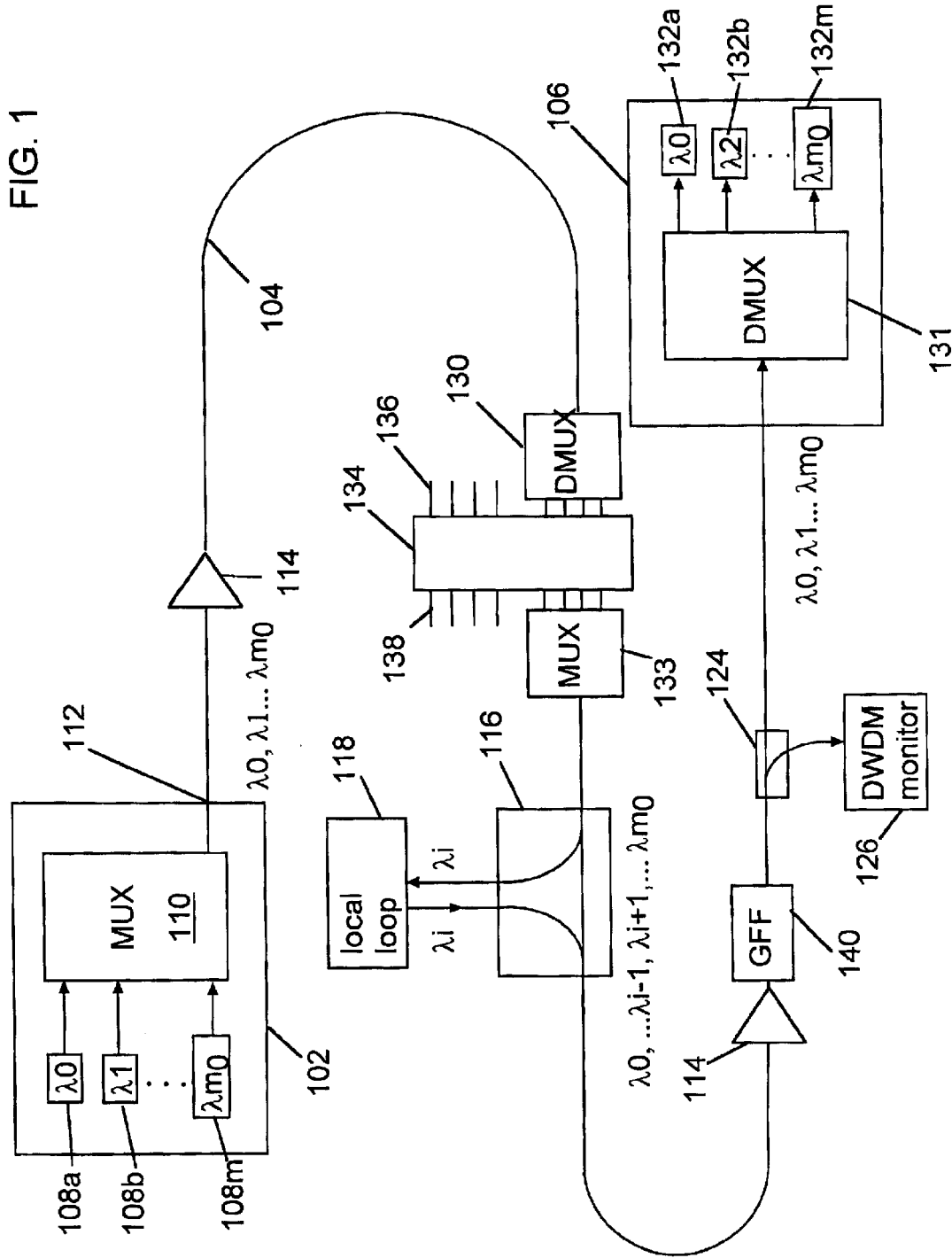
FIG. 1 schematically illustrates an optical WDM communications system that employs diffractive WDM devices according to the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

DWDM communications systems use several channels of light at different optical frequencies. According to the ITU standards, the channels are evenly spaced by frequency. Thus, the mth channel has a frequency given by $v_o + m\Delta v$, where $v_o$ is a lowest channel frequency, $\Delta v$ is the channel separation and m is an integer value ranging from 0 to $m_0$, the upper value. The value of $m_0$ may be any suitable number, for example 19, 39, 79, or higher. According to commonly used ITU standards, the channel separation, $\Delta v$, may be, amongst other values, 100 GHz or 50 GHz. In the following discussion, the different DWDM channels are described in terms of both frequency and wavelength. It will be appreciated that each channel has a unique wavelength and frequency given through the relationship $v_m \cdot \lambda_m = c$, where $v_m$ and $\lambda_m$ are, respectively, the frequency and wavelength of the mth channel, and c is the speed of light.

One particular embodiment of a DWDM optical communications system 100 is illustrated in schematic form in FIG. 1. A DWDM transmitter 102 directs a DWDM signal having $m_0$ channels through a fiber communications link 104 to a DWDM receiver 106.

This particular embodiment of DWDM transmitter 102 includes a number of light sources 108a–108m that generate light at different wavelengths, $\lambda 0, \lambda 1 \ldots \lambda m_0$, corresponding to the different optical channels. The light output from the light sources 108a–108m is combined in a DWDM combiner unit 110, or multiplexer (MUX) unit to produce a DWDM output 112 propagating along the fiber link 104.

Light sources 108a–108m may be modulated laser sources, or laser sources whose output is externally modulated, or the like. It will be appreciated that the DWDM transmitter 102 may be configured in many different ways to produce the DWDM output 112. For example, the MUX unit 110 may include an interleaver to interleave the outputs from different multiplexers. Furthermore, the DWDM transmitter 102 may be equipped with any suitable number of light sources for generating the required number of optical channels. For example, there may be twenty, forty or eighty optical channels, or more. The DWDM transmitter 102 may also be redundantly equipped with additional light sources to replace failed light sources.

Upon reaching the DWDM receiver 106, the DWDM signal is passed through a demultiplexer unit (DMUX) 131, which separates the multiplexed signal into individual channels that are directed to respective detectors 132a–132m.

The fiber link 104 may include one or more fiber amplifier units 114, for example rare earth-doped fiber amplifiers, Raman fiber amplifiers or a combination of rare earth-doped and Raman fiber amplifiers. The fiber link 104 may include one or more DWDM channel monitors 126 for monitoring the power in each of the channels propagating along the link 104. Typically, only a small fraction of the light propagating along the fiber link 104 is coupled out by a coupler 124 and directed to the DWDM channel monitor 126. The fiber link 104 may also include one or more gain flattening filters 140, typically positioned within or after an amplifier unit 114, to make the power spectrum of different channels flat.

The fiber link 104 may include one or more optical add/drop multiplexers (OADM) 116 for directing one or more channels to a local loop. In the particular embodiment illustrated, the OADM 116 drops the ith channel, operating at wavelength $\lambda i$, and directs it to the local loop 118. The local loop 118 also directs information back to the OADM 116 for propagating along the fiber link 104 to the DWDM receiver 106. In the illustrated embodiment, the information added at the OADM 116 from the local loop 116 is contained in the ith channel at $\lambda i$. It will be appreciated that the information directed from the local loop 118 to the OADM 116 need not be at the same wavelength as the information directed to the local loop 118 from the OADM 116. Furthermore, it will be appreciated that the OADM 116 may direct more than one channel to, and may receive more than one channel from, the local loop 118.

The fiber link 104 may also include one or more optical cross-connect switches 134, for connecting to other optical circuits. The WDM signal from the transmitter unit 102 is typically demultiplexed in a DMUX 130 and the demultiplexed signal is then fed into the optical cross-connect switch array 134, which couples signals from the DMUX 130 and from other systems through ports 136. On the output side of the optical cross-connect switch array 134, some output signals are coupled to a MUX 133 that multiplexes the output signals into a WDM signal that is transmitted to the receiver unit 106. Other outputs 138 from the optical cross-connect switch array 134 may be coupled to other systems.

Figure 2:
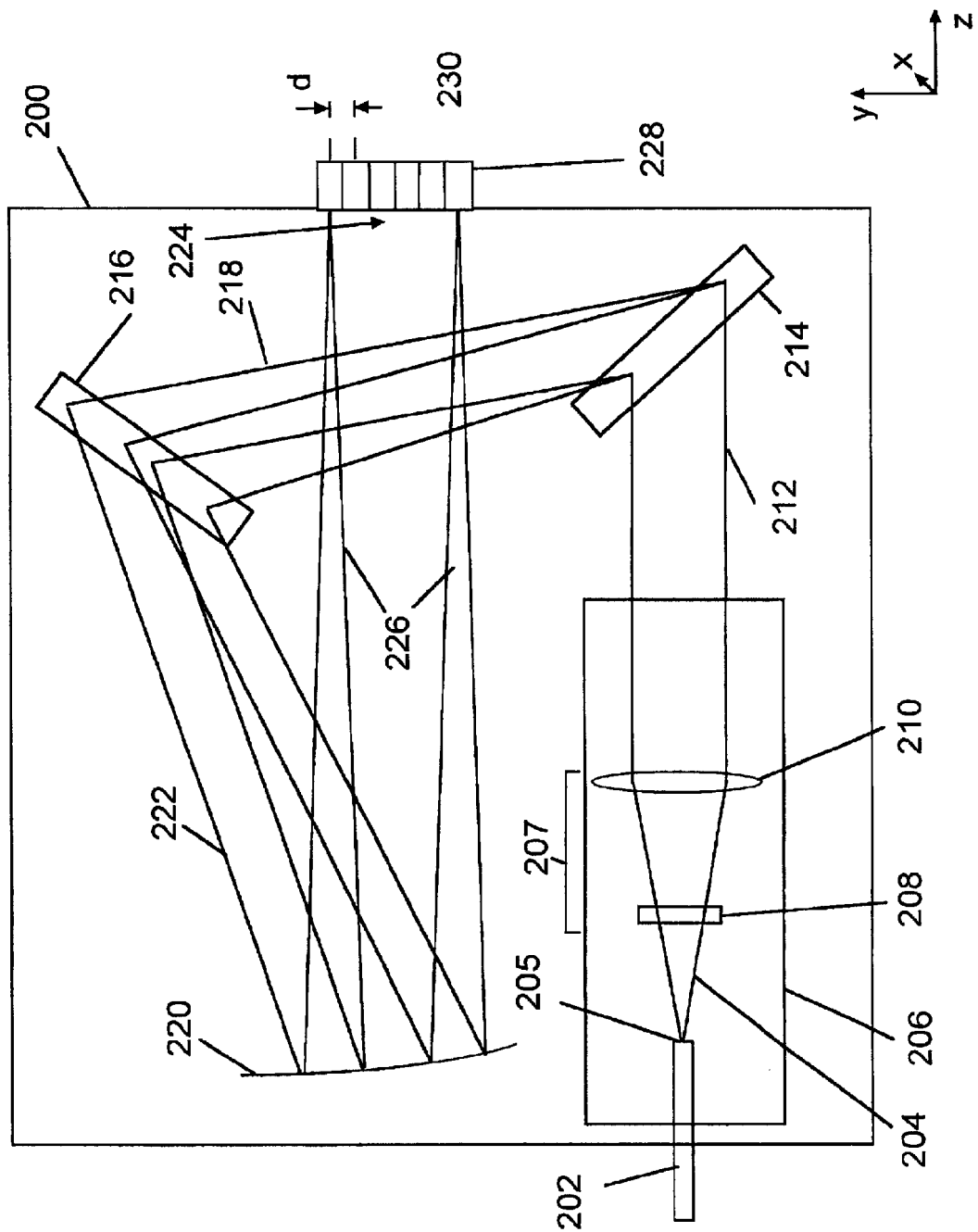
FIG. 2 schematically illustrates a diffractive WDM device.

An embodiment of a diffractive WDM device 200 that is useful in DWDM communications is illustrated in FIG. 2. In this particular embodiment, light is fed into the device 200 via a waveguide 202, for example an optical fiber, that carries a WDM light signal. The multiple channel light 204 from the fiber 202 is input to the WDM device 200 by an input unit 206, that includes the fiber end 205 and may also include other optical elements such as one or more lenses for reducing the divergence of, or collimating, the light from the fiber end 205. In this particular embodiment, the input unit 206 produces a collimated beam of light 212 that is directed to the first grating 214, using a collimation lens system 207 comprising a first cylindrical lens 208 for collimating the light in the x-z plane, out of the plane of the figure, and a second cylindrical lens 210 for collimating the light in the y-z plane, in the plane of the figure. Other combinations of lenses may be used in the input unit 206, as is explained further below.

The collimated light beam 212 is incident on a first transmission diffraction element 214, typically in the form of a diffraction grating. The first transmission diffraction element 214 may be formed from glass, and other suitable materials that transmit light at the wavelength range of interest. Such materials may include Si, $SiO_2$, $Si_3N_4$ and SiON. One applicable wavelength range of interest is 800 nm–2000 nm, which covers the range of wavelengths typically selected for optical fiber communications, although it will be appreciated that other wavelength ranges may be used.

The term transmission diffraction element as used herein refers to structures that diffract light passing therethrough. The transmission diffraction element may have a strictly periodic structure, such as a linear grating, or may have a structure that is not strictly periodic, such as a nonlinear grating. For example, the structure may have a chirped period, where the period changes from one end of the structure to the other. Use of a chirped grating requires the use of a different focusing element from that required when using a linear grating. If there is a substantial variation in the periodicity of the transmission diffraction element, then the transmission diffraction element demonstrates focusing capabilities in addition to dispersing the different wavelengths of the light passing therethrough. In the following description, the term transmission diffraction element refers to both linear and nonlinear structures. Many of the examples described below illustrate the use of a linear diffracting structure, but it will be appreciated by those of ordinary skill in the art that nonlinear diffracting structures may also be used.

One approach to forming a transmission diffraction element 214 is to etch a slotted structure into a substrate. The depth and length of the slots, and the ratio of the etched slot width to the unetched material width between slots, determine, at least in part, the diffraction properties of the transmission diffraction element 214. The spatial variation in grating periodicity determines the focusing capabilities of the transmission diffraction element 214. The transmission diffraction element 214 may have a diffraction efficiency into the first diffraction order as high as 99.9%. In one embodiment of a diffracting element 214, particularly suitable where the light incident on the element 214 is TE polarized, the element is formed from fused silica, the diffracting structure is 1050 nm, with a groove duty cycle of 51%. The groove depth is about 2 $\mu$m and the incident angle on the grating is about 31°. In another embodiment, particularly suitable for randomly polarized light, the groove depth of the diffracting structure is about 6.7 $\mu$m.

The collimated light beam 212 is diffracted by the first transmission diffraction element 214 towards a second transmission diffraction element 216 as a singly-diffracted beam 218. The beam 218 diffracted by the diffracting element 214 spreads out according to wavelength in the so-called diffraction plane, which is parallel to the y-z plane. The diffracted beam 218 is diffracted by the second transmission diffraction element 216 towards a focusing optic 220 as a doubly-diffracted beam 222. The first and second transmission diffraction elements 214 and 216 are typically oriented so as to diffract light into their first diffraction orders.

The focusing optic 220 directs and focuses the doubly diffracted beam 222 towards a light dispersed region 224, which may also be referred to as the output plane. The doubly-diffracted beam 222 includes components 226 of different wavelength, corresponding to different optical channels, that propagate along different paths due to diffraction at the first and second transmission diffraction elements 214 and 216. By focusing the different wavelength components 226 at the light dispersed region 224, the different wavelength components 226 are physically separated and may subsequently be operated on individually and separately from the other wavelength components 226 by a light handling unit 228. The focusing optic 220 may be a spherical or an aspherical mirror. An aspherical mirror may permit the different channels to be focused at the light dispersed region 224 with uniform spacing, as is discussed further below.

The light handling unit 228 is typically a multi-segmented device, with several segments 230, each segment corresponding to one of the dispersed channels. In the illustrated embodiment, the light handling unit 228 includes six segments, but it will be appreciated that the light handling unit 228 may include any other desired number of segments. For example, if the multiple channel light 204 includes forty channels, then the light handling unit 228 typically includes at least forty segments.

The spacing between adjacent segments 230 may be constant across the light handling unit 228. For example, the center-to-center spacing between each adjacent pair of segments 230 may be d, as illustrated. On the other hand, the spacing between adjacent segments 230 need not be constant across the light handling unit 228. For example, the center-to-center spacing between segments 230 may increase across the light handling unit 228, so that the spacing between the first and second segments is d, and between the second and third segments is d+$\Delta$d, and so on, with the spacing between the (M−1)th and Mth segments being d+(M−2)$\Delta$d. Furthermore, the change in segment separation need not be linear across the light handling unit 228, but may vary in a nonlinear fashion.

The spacing between segments 230 is preferably selected so as to align the segments 230 to the dispersion of the different optical channels in the light dispersion region 224. The dispersion is determined by the diffracting power of the two gratings 214 and 216, and the focusing power of the focusing optic 220. The diffractive WDM device 200 is described further in U.S. application Ser. No. 09/790,144, filed on Feb. 21, 2001, and incorporated herein by reference.

Figure 3:
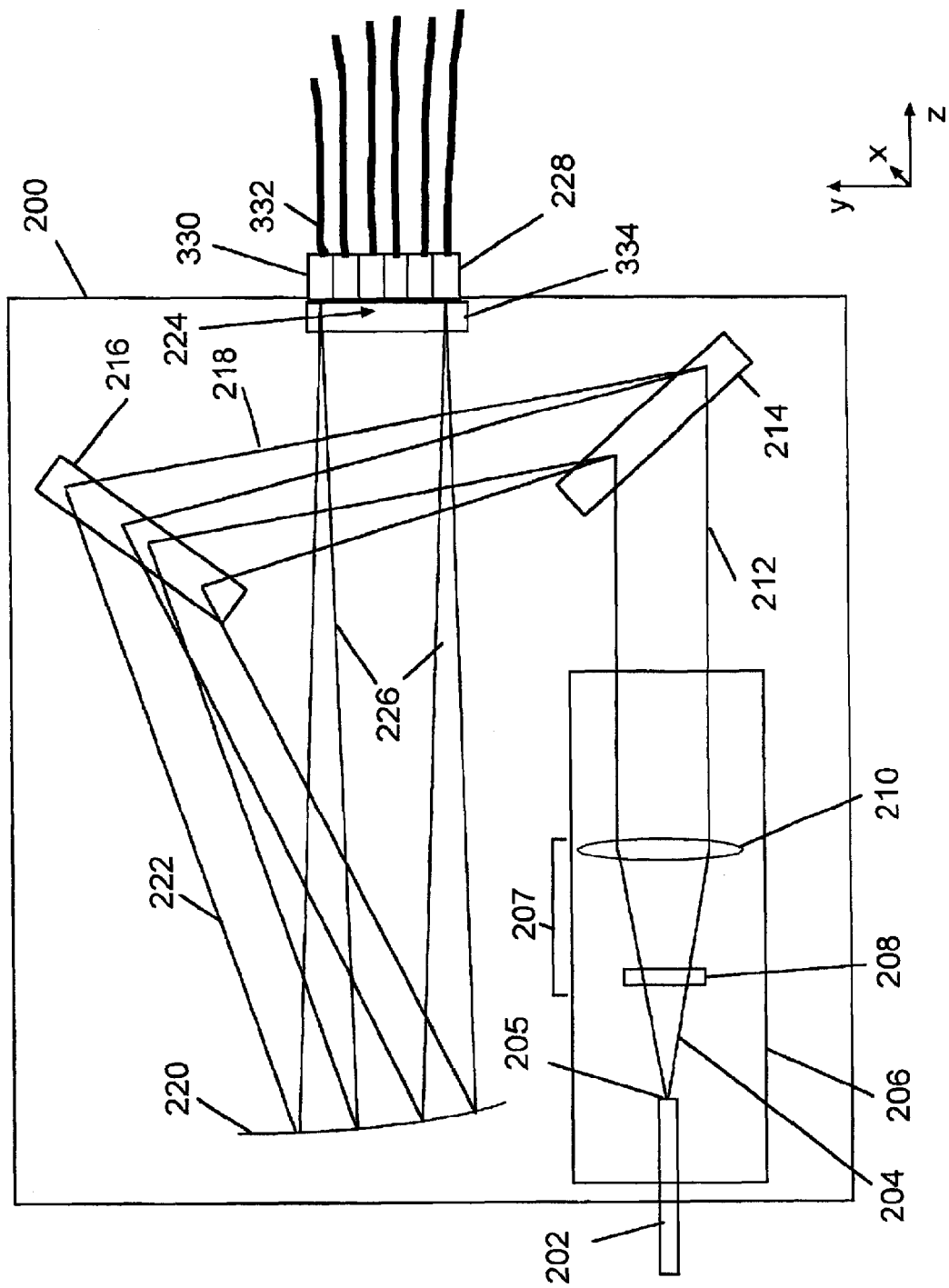
FIG. 3 schematically illustrates a diffractive WDM device configured as a MUX/DMUX.

In one embodiment, the light handling unit 228 may be a fiber optic array 330, for example as illustrated in FIG. 3, so that each of the channels is fed into its own individual fiber 332. Where a multiple channel signal propagates into the device 200 through fiber 202, light of individual channels propagates away from the device along respective fibers 332. It will be appreciated that in such a configuration, the device 200 operates as a demultiplexer (DMUX). If single channel light of appropriate wavelengths is directed along the fibers 332 towards the device 200, then the light at the different channels may be combined by the transmission diffraction gratings 216 and 214 to produce a multiple channel output signal at the fiber 202. In such a configuration, the device 200 operates as a multiplexer (MUX). It will also be appreciated that the device 200 may accommodate a large number of optical channels, with a requisite number of fibers in the fiber array 330, and is not restricted to using only six channels into six fibers as illustrated in the figure.

The fibers 332 of the fiber array 330 may be regarded as being the segments 230 of the light handling device 228. The separation between the cores of adjacent optical fibers 332 may be set to be the same as the spatial separation of the individual channels at the light dispersed region 224. Thus, individual channels may be matched to respective fibers 332. Where aspheric focusing optics 220 are used, the separation between fibers 332 may be uniform. However, the dispersion of the different optical channels need not be linear in the dispersion region 224, and so the separation between fibers 332 need not be uniform, but set to match the nonlinear dispersion of the different channels.

A lens unit 334, for example a lens array, may be positioned to focus each channel into its respective fiber 332. An advantage provided by the lens unit 334 is an increase in coupling efficiency into the fibers 332. Where the lens unit 334 is a lens array, the spacing of the lenses on the lens array 334 is typically arranged to match the spacing of the fibers 332. Therefore, if the fibers 332 are uniformly spaced, the lenses of the lens array 334 are typically uniformly spaced. On the other hand, if the fiber spacing is nonuniform, then the lens spacing is typically nonuniform in a manner that matches the nonuniformity in the fiber spacing.

Figure 4:
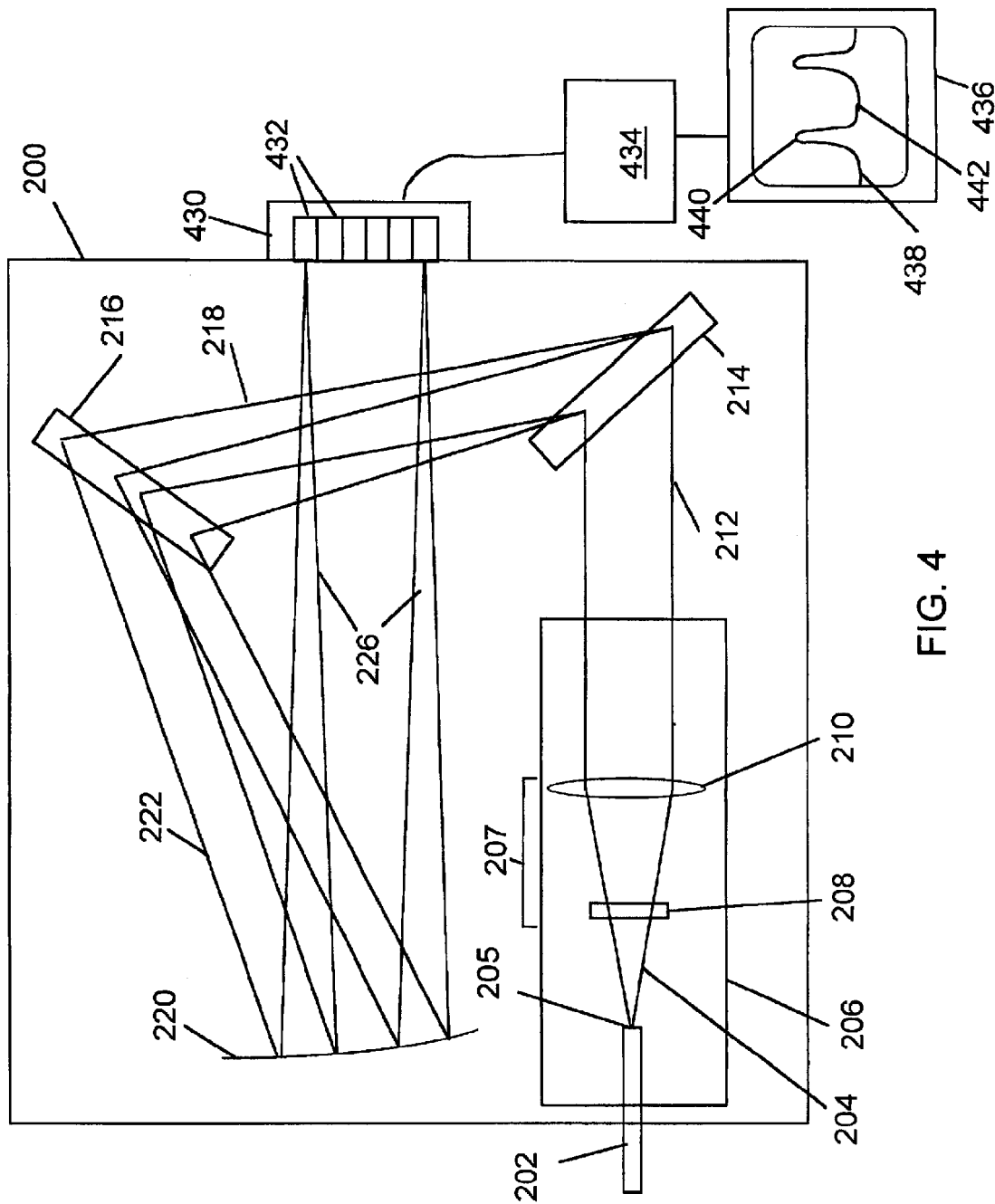
FIG. 4 schematically illustrates a diffractive WDM device configured as a channel monitor.
Figure 5:
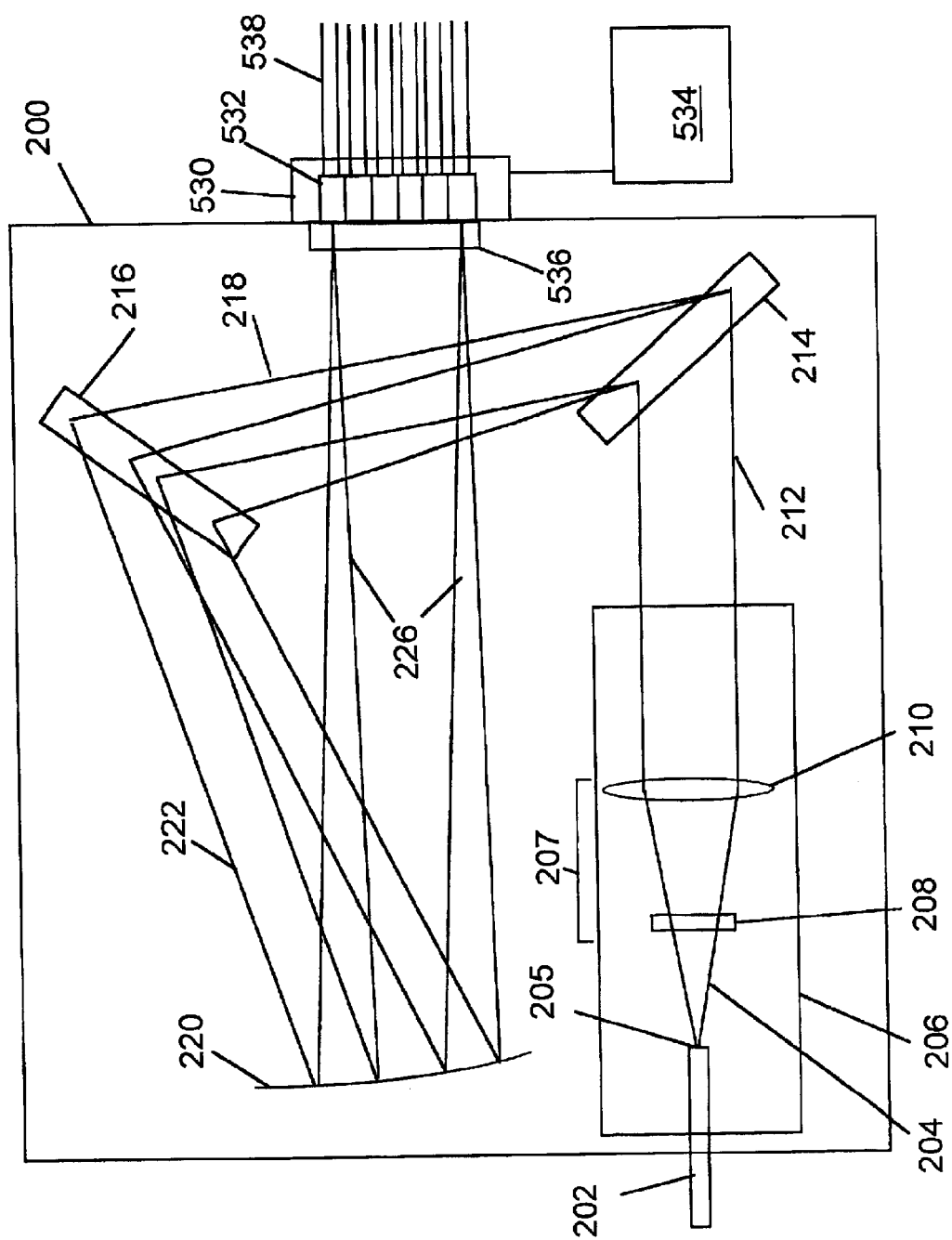
FIG. 5 schematically illustrates a diffractive WDM device configured as an optical add/drop multiplexer.

In another embodiment, the light handling unit 228 may be a detector unit 430, for example as is illustrated in FIG. 4. The detector unit 430 typically includes a number of individual photodetectors 432. The photodetectors 432 may be, for example, individual photodiodes or charge coupled devices. This approach is suitable for monitoring the power in each channel. The photodetectors 432 may also comprise an integrated photodetector array, for example an integrated array of photodiodes or charged coupled devices. Such an integrated array typically includes a large number of pixels, for example up to 256 pixels, or higher. The use of an integrated array not only permits power monitoring, but also permits wavelength measurement of the individual channels, and also permits the measurement of noise between the channels.

The output from the detector unit 430 may be directed to a channel analysis unit 434 that analyzes the signals from the photodetectors 432. In the illustrated embodiment, the channel analysis unit 434 includes a display 436 showing a signal 438 such as might be generated using an integrated photodiode array. The signal 438 shows individual peaks 440 corresponding to the individual channels. The heights of each peaks 440 indicates the power level in the corresponding channel. The position across the screen 436 of each peak 440 indicates its respective wavelength. The regions 442 between the peaks 440 show whether there is any interchannel noise.

When equipped with a detector unit 430, the diffractive WDM device may be used as a channel monitor for monitoring the power levels in each channel. This is useful for monitoring gain equalization in fiber amplifiers, fault detection in optical add/drop multiplexers (OADMs), and power equalization near transmitters and/or OADMs.

In another embodiment, the light handling unit 228 may be an optical switch unit 530, having individual optical switches 532 associated with each optical channel. Lenses, for example in the form of a lens array 536 may be positioned in front of respective switches 532 so as to focus the incoming light into the switch 532. When used with a switch array, the device 200 may be useful as an optical add/drop multiplexer (OADM). In this configuration, multiple channel light enters the device 200 from the fiber 202 and the separated channels at the light dispersed region 224 are incident on the switch unit 530 that includes a number of optical switches 532 for all, or a selected number, of respective channels. A control unit 534 may be connected to the switch unit 530 to control the activation states of the switches 532, thus providing programmability to the OADM device 200.

Each switch 532 is positioned so as to lie on the path of its respective channel at the dispersed region 224. The switches 532 may be reflection/transmission switches, that either transmit light to associated fibers 538, or reflect the light back into the unit 200. Instead of being reflection/transmission switches, the switches 532 may be reflection switches that selectively reflect the associated optical channels along one or more output optical paths within the device 200. For example, an output path from the switches may pass via the diffracting elements 216 and 214 to combine the different optical channels into a multiple-channel signal that is passed to a focusing unit. The focusing unit may be positioned beside the input unit 206 and be configured like the input unit 206, but operated with light passing in the reverse direction so as to focus to an output fiber.

Figure 6:
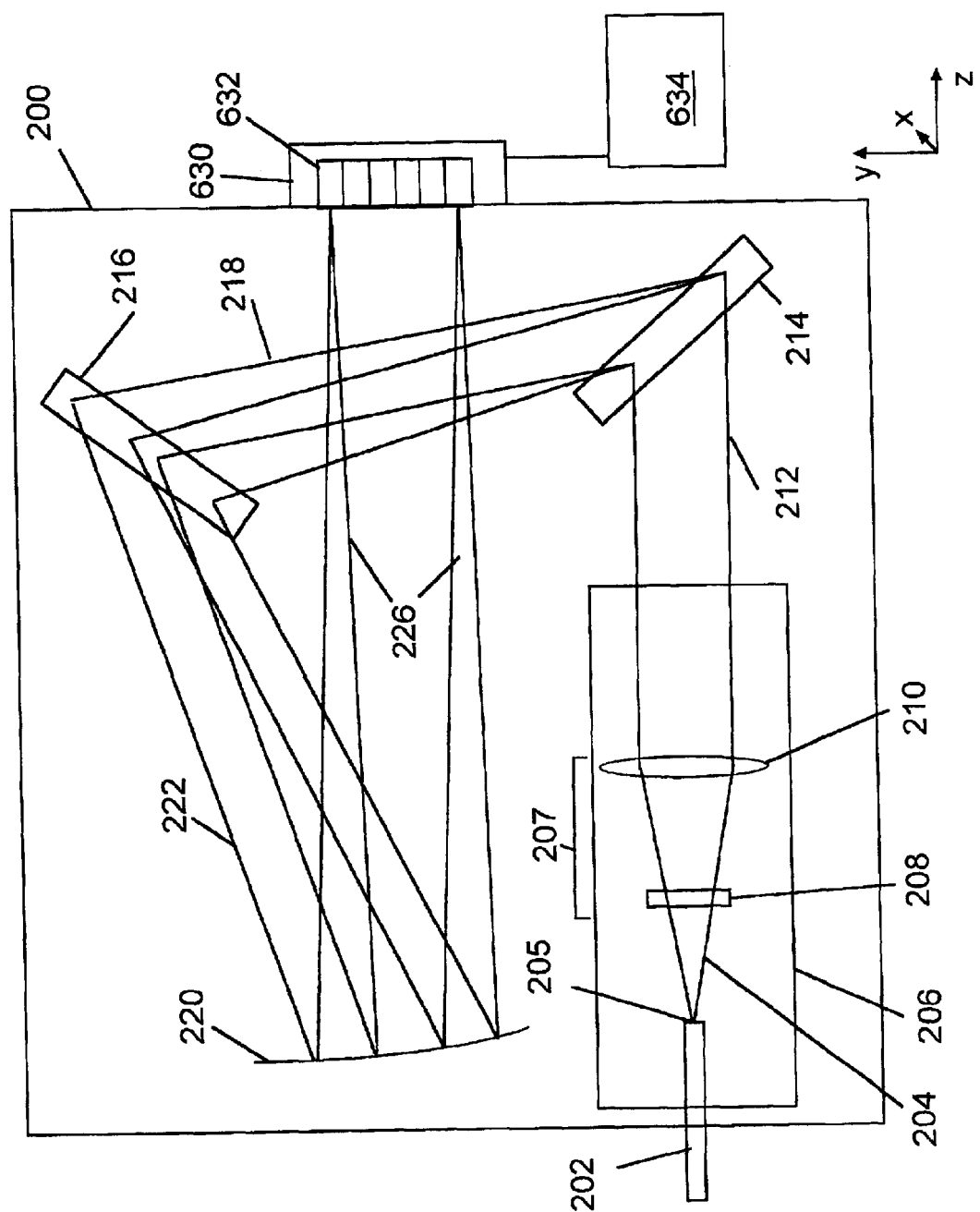
FIG. 6 schematically illustrates a diffractive WDM device configured as a gain flattening filter.

In another embodiment, illustrated in FIG. 6, the light handling unit 228 may be a set 630 of reflectors 632 for reflecting light in each of the channels for use as a gain flattening filter. It is often useful to ensure that the intensity in each channel in a multi-channel WDM signal is approximately of the same intensity. Some types of fiber amplifier, for example an erbium-doped fiber amplifier have a non-uniform gain profile, with the result that some channels are amplified to greater power levels than others. A gain flattening filter (GFF) is often used with a fiber amplifier to make the channel power levels more uniform. Typically, an amplifier unit includes a pre-amplifier and a power amplifier, with the GFF placed between the pre- and power amplifiers. The reflectivity of the reflectors 632 is lower for those channels amplified to a greater power level in the amplifier and is higher for those channels amplified to a lesser power level in the amplifier.

The reflectors 632 may be static or may be dynamic, for example under the control of a controller 634. A reflector unit whose reflectivity is dynamically adjustable may be formed, for example, using an input polarizer, a liquid crystal layer and a highly reflecting surface. The light at the dispersion region 224 is typically polarized and enters the polarizer without loss. The liquid crystal layer rotates the polarization of the light to a greater or lesser degree, under control of the controller, and the light is reflected by the highly reflecting surface for a double pass through the unit. Light that has been polarization rotated to a greater degree suffers higher losses on passing back out through the polarizer than light that has been polarization rotated to a smaller degree. The amount of polarization rotation for each reflector unit 632 may be adjusted dynamically by the controller 634.

Light reflected by the set of reflectors 630 may pass back through the device 200 along the same path as the incoming light, or along a path that substantially parallels that of the incoming light. In the latter case, the path of the outgoing light is typically shifted in the x-direction relative to the path of the incoming light.

It will be appreciated that the invention may be used with any type of light handling device 228 and is not restricted to the types of light handling device described herein, which are presented as examples only, and not for limiting the invention in any way.

Figure 7:
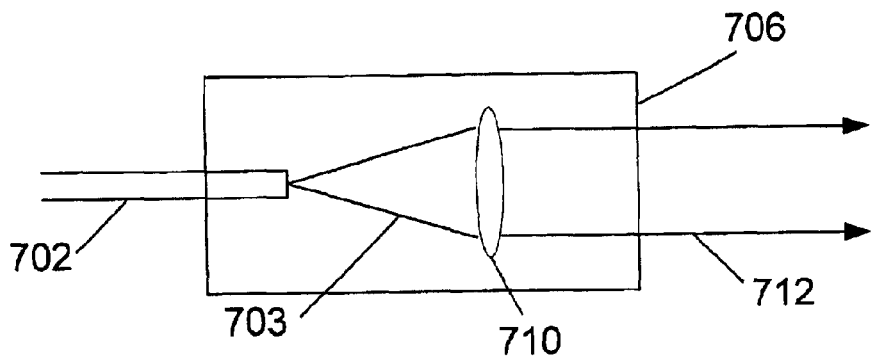
FIGS. 7–9 schematically illustrate different configurations of input unit according to the present invention.

Other configurations of input unit may also be used instead of the particular configuration of input unit 206 described above. For example, one configuration of input unit 706, illustrated in FIG. 7, has a single lens 710 disposed to collimate the output light 703 from the fiber 702. The end of the fiber 702 is positioned close to the focal point of the lens 710 to produce an approximately collimated beam 712.

Figure 8:
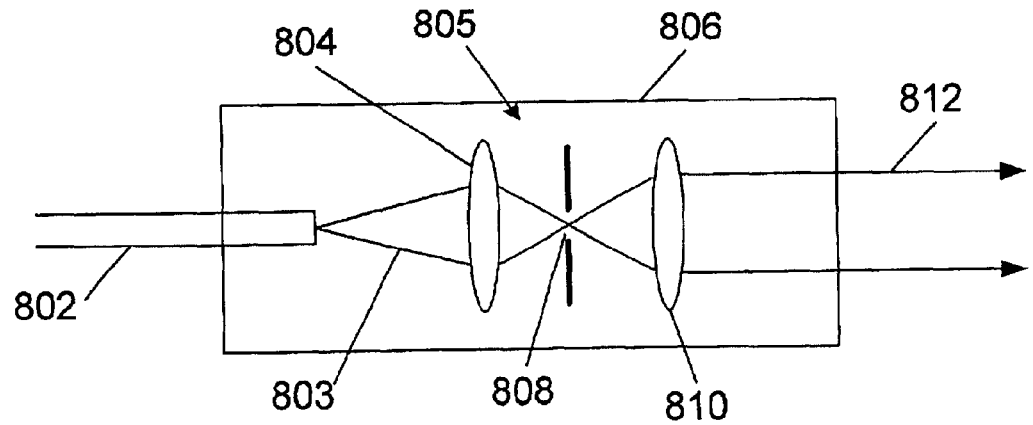

Another configuration of input unit 806 is illustrated in FIG. 8, where the light 803 from the fiber 802 is first spatially filtered, in a spatial filtering unit 805, by focusing the light from the fiber 802 through an aperture 808 using a first lens 804. The light diverging from the aperture 808 is then collimated using a collimation lens 810, to produce a collimated beam 812. An advantage of using a spatial filter is that stray light input to the device 200 is reduced.

Figure 9:
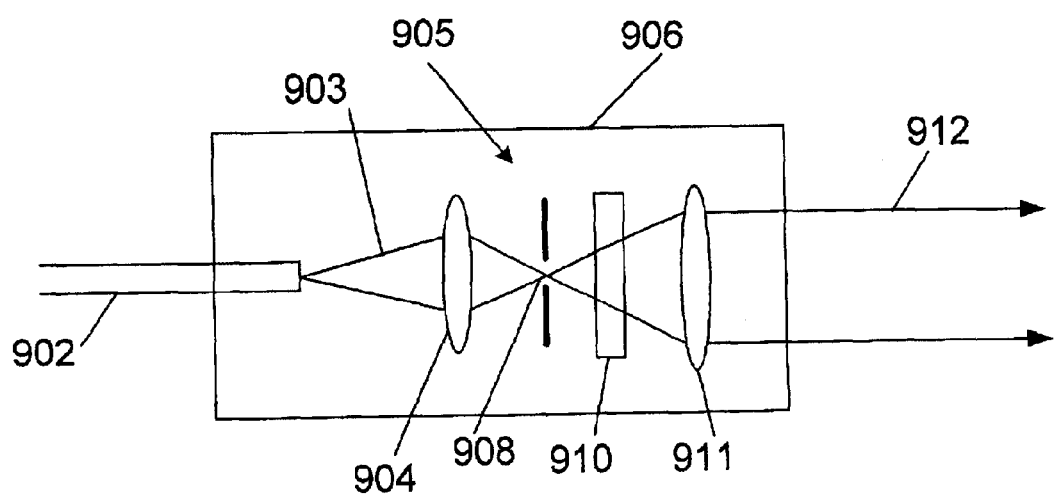

Another configuration of input unit 906 is illustrated in FIG. 9, where the light 903 from the fiber 902 is spatially filtered in a spatial filtering unit 905 that includes a first lens 904, and an aperture 908. Instead of a single collimating lens, two cylindrical collimating lenses 910 and 911 are disposed to collimate the light following the aperture 908. The first collimating lens 910 collimates the light in one dimension and the second collimating lens 911 collimates the light in a second dimension. Use of two collimating lenses 910 and 911 permits the collimated beam 912 to have a cross-section that has a vertical dimension different from the horizontal dimension, if desired.

Some diffraction elements display higher diffraction efficiency for TE polarized light, whose electric vector is parallel to the grooves of the diffracting element, than for TM polarized light, whose magnetic vector is parallel to the grooves of the diffracting element. Consequently, the total diffraction efficiency of the diffraction elements 214 and 216 may be reduced if randomly polarized light is transmitted into the device 200. It is, therefore, advantageous for the input device to convert incoming, randomly polarized light to a polarization state that is efficiently diffracted by the diffraction elements 214 and 216 in order to reduce the overall losses of the diffractive device.

Figure 10A:
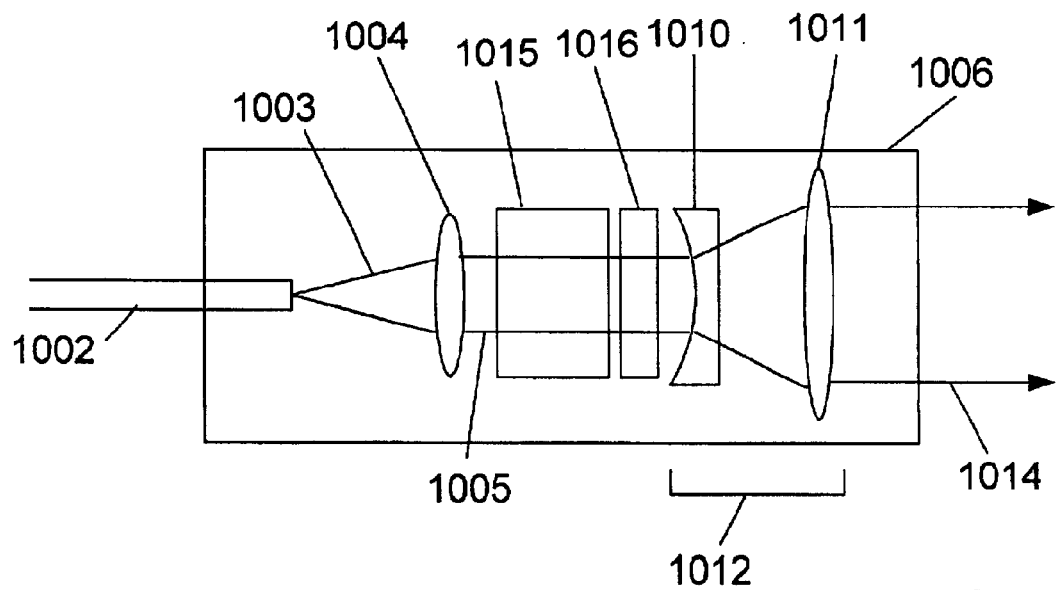
FIGS. 10A and 10B schematically illustrate a configuration of an input unit according to the present invention.
Figure 10B:
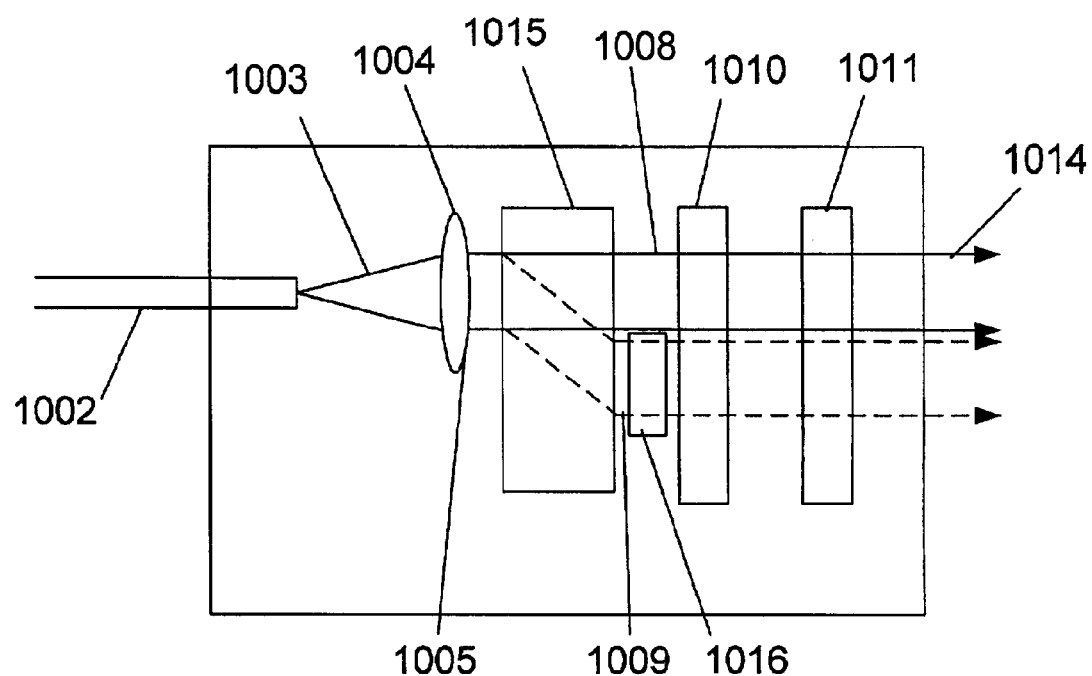

One particular configuration of input unit 1006 that produces a polarized beam from a randomly collimated input beam is shown in FIGS. 10A and 10B. The view in FIG. 10A schematically depicts a top view of the input unit 1006, looking in a direction along the x-axis, perpendicular to the diffraction plane. The view in FIG. 10B schematically depicts the side view of the input unit 1006, looking in a direction along the y-axis, parallel to the diffraction plane. Randomly polarized light 1003 enters the unit 1006 from the fiber 1002 and is collimated by a first lens 1004 to produce the first collimated beam 1005.

The first collimated beam 1005 is then passed into a polarization separator 1015 which splits the collimated beam 1005 into two beams 1008 and 1009 having orthogonal polarization states. In the illustrated embodiment, the polarization separator 1015 is a birefringent separator that separates an extraordinary beam 1009 (dashed lines) from an ordinary beam 1008 (solid lines) using the effect of birefringent walk-off. The two beams 1008 and 1009 emerge parallel from the polarization separator 1015. The polarization of one of the beams 1008 and 1009 is rotated through 90° by a polarization rotator 1016, for example a half-wave retardation plate or a Faraday rotator, so that its polarization is parallel to that of the other beam. The two beams 1008 and 1009 then pass through a cylindrical expanding telescope 1012, formed from first and second cylindrical lenses 1010 and 1011, that expands the beams in the y-direction so as to produce a polarized and collimated output 1014 having a desired width in the y-direction.

Other types of polarization separator may be used instead of the birefringent separator 1015 illustrated. For example, the polarization separator may employ a polarization beamsplitter to produce orthogonally polarized beams. One or more reflectors may be used to direct the resulting beams so as to be parallel.

It will be appreciated that other configurations of input unit may be employed. For example, an input unit may include a spatial filter and a polarization separator. Furthermore, the lenses used in the input unit may be spherical, aspherical, cylindrical, or toroidal as desired.

In a well aligned system, the channel spacing of the diffracted light at the dispersed region matches the segment spacing of the light handling unit 228. The diffractive device, comprising the input unit, the diffracting elements and the focusing optics, may, however, be passively assembled, in other words assembled without active alignment of optical components. This leads to relaxed tolerances and a system that is less expensive to manufacture. However, after passive assembly, the channel spacing at the diffracted region may deviate from the spacing of the light handling unit, d.

One approach to adjusting the channel spacing of the diffracted light in the dispersed region 224 is to adjust the angle of incidence of the beam 212 on the first diffracting element 214. This may be done, for example by rotating the diffracting element 214. This requires, however, that at least one of the diffracting elements, and more usually both, be mounted on a rotatable mount.

Another approach is to adjust the orientation of the input unit 206 so that the beam 212 is incident on the first diffracting element 214 at a different angle. Once the input unit 206 has been adjusted so that the light 212 is incident on first diffracting element 214 at an angle that gives the desired light channel separation at the dispersed region, the input unit 206 may be clamped in place so as to give a fixed relationship between the input unit 206 and the first diffracting element 214.

One embodiment of a diffractive WDM device 1100 that provides for adjustment of the input unit relative to the first diffracting element is discussed with reference to the exploded view shown in FIG. 11 and the view in FIG. 12A. The particular device 1100 illustrated is a channel monitor, and includes a multichannel detector to detect light in each of the optical channels.

The device 1100 includes a housing 1102 that may be machined, cast or molded. Four precision machined pads 1104, 1106, 1108 and 1109 on the inside of the housing provide for precise mounting of parts as is described later. The input unit includes a collimation unit 1110 disposed within the housing 1102. A fiber tail 1111 mates the fiber 1160 to the collimation unit 1110. The fiber tail 1111 includes a bushing 1114 held between a ferrule 1112 and a stopper 1116. The fiber tail 1111 is mounted on the outside of the housing 1102, over the input aperture 1118. The collimation unit 1110 is mounted on the mounting portion 1120. In this particular embodiment, the collimation unit 1110 is similar to the type illustrated in FIG. 10, and includes a collimator/polarization separator 1121 mounted within a block 1122. A rod lens 1124 is mounted in the block to expand the beam received from the collimator/polarization separator 1120, and a cylindrical collimating lens 1126 is mounted at the end of the block 1122 to produce a collimated output beam. The block 1122 is mounted over the pin 1127 of the first precision pad 1104 and is pivotable around the pin 1127. Screws 1128 are used to hold a clamp 1130 against the bushing 1132 on the lower side of the block 1122.

The grating frame 1134 holds two diffraction elements 1136 and 1138, and is mounted against the three remaining precision-machined pads 1106, 1108 and 1109. Pins on two of the pads 1108 and 1109 ensure that the grating frame 1134 is mounted within the housing at the desired orientation.

A curved focusing mirror 1140 is mounted within the housing on a precision machined pad 1162 against a stopper 1164. A cylindrical lens 1142 is mounted on a lens frame 1144 that is then mounted within the grating frame 1134. The cylindrical lens 1142 is used to focus the light in the x-direction so as to increase the intensity of the light incident on the detectors in the detector array 1146. The detector array 1146, for example an InGaAs photodiode or CCD array, is mounted on the detector frame 1148, which attaches to the grating frame 1134.

The cover 1150 may be placed over the housing 1102 to seal the optical components from being contaminated by e.g. dust. A flex print 1156 connects the detector array 1146 to the printed circuit board (PCB) 1158 that contains electronics for analyzing the signals produced by the detector array 1146. When the device 1100 is assembled, the PCB 1158 lies inside the housing, parallel to the cover, and is connected to the electrical pins 1152 that feed through the cover 1150 for external contact.

The device 1100 is initially assembled with passive alignment, in other words in reliance on the manufacturing tolerances of the different components of the device. In order to align the light passing through the device 1100, the light is first aligned on the detector array 1146 in the x-direction. This may be performed by physically translating the detector array 1146 with screws 1154 in the x-direction, or by translating the cylindrical lens 1142 in the x-direction. Also, the detector array 1146 may be rotated in the x-y plane by adjusting the screws 1154 so as to align the separated optical channels along the detector array.

Next, the desired spacing between optical channels on the detector 1146 is obtained by adjusting the direction of the light directed towards the first diffracting element 1136 in the y-z plane by rotating the collimation unit 1110 about the pin 1127. Once the desired orientation has been achieved, the collimation unit 1110 is clamped in place by the clamp 1130.

Figure 12A:
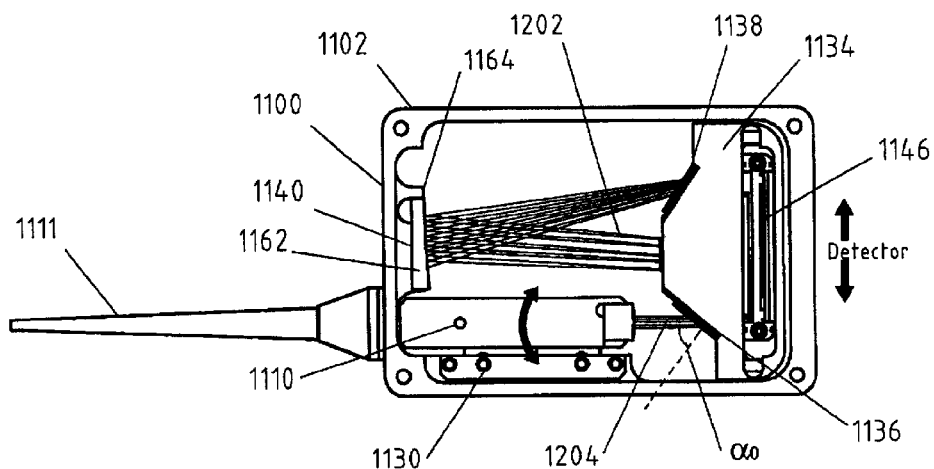
FIGS. 12A–12C schematically illustrate the dependence of light dispersion within a diffractive WDM device on angle of incidence on the diffractive element, according to an embodiment of the present invention.
Figure 12B:
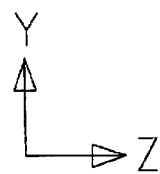
Figure 12B:
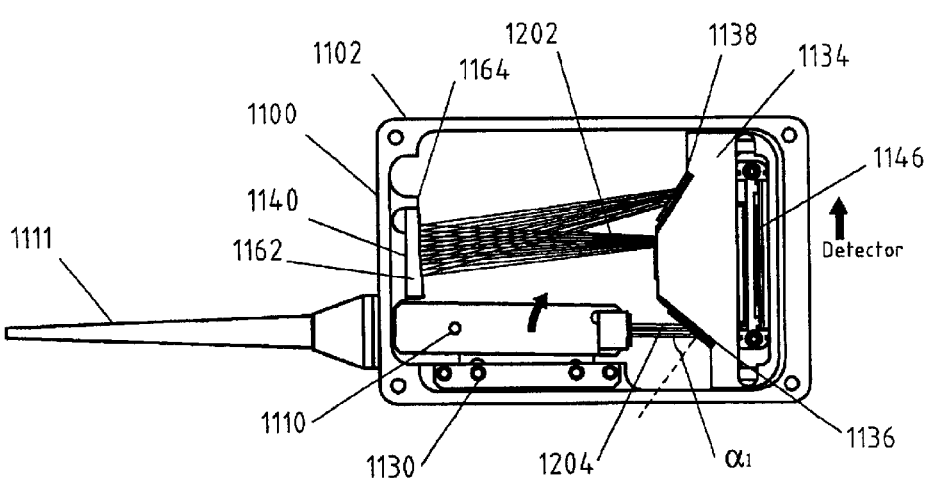
Figure 12C:
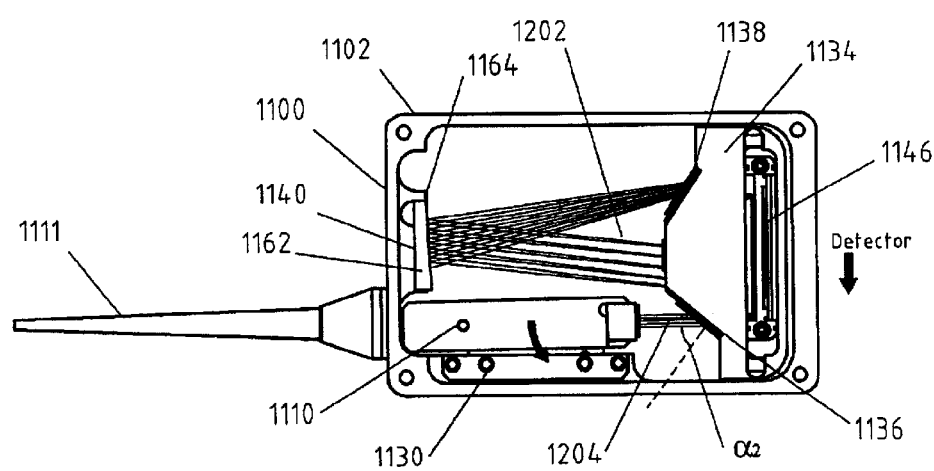

The effects of orienting the collimation unit 1110 are illustrated in FIGS. 12A–12C. FIG. 12A illustrates the device 1100 with the collimation unit 1110 in a neutral position, with the optical channels 1202 dispersed by a medium amount in the dispersion region. The angle of incidence on the light 1204 on the first diffracting element 1136 is $\alpha$. In this neutral position, the angle of incidence is $\alpha_0$.

FIG. 12B illustrates the device 1100 when the collimation unit 1110 has been rotated about the pin 1127 in a clockwise direction, so that the light 1204 is incident on the first diffracting element 1136 at an angle $\alpha 1$, where $\alpha 1 > \alpha_0$. It is readily seen that the dispersion between the optical channels is reduced, and so the inter-optical channel spacing on the detector 1146 is also reduced. Furthermore, the optical channels 1202 are directed to a different portion of the detector 1146, and are generally directed to a portion of the dispersion region having an increased y-coordinate. The detector 1146 may be moved in the positive y-direction so as to intercept the light, since the redirection of light may move some of the light off the detector 1146.

FIG. 12C illustrates the device 1100 when the collimation unit 1110 has been rotated about the pin 1127 in a counter-clockwise direction, so that the angle of incidence on the first diffracting element is reduced to $\alpha 2$, where $\alpha 2 < \alpha_0$. The dispersion between the optical channels is increased, and so the inter-optical channel spacing on the detector 1146 is also increased. Furthermore, the optical channels 1202 are directed to a different portion of the detector 1146, and are generally directed to a portion of the dispersion region having a reduced y-coordinate. The detector 1146 may be moved in the negative y-direction so as to intercept the light, since the redirection of light may move some of the light off the detector 1146. The change in inter-channel dispersion and the angle through which light is redirected to the detector 1146 have been exaggerated in FIGS. 12B and 12C, for purposes for clarity of illustration.

FIGS. 11 and 12A–12C show the collimation unit 1110 being rotated about a pin 1127 that is located close to the collimation lens 1126. There is no requirement, however, that the pin 1127 be located at the collimation lens 1126, and the pin 1127 may be located elsewhere, for example closer to the first diffracting element 1136 or closer to the input fiber 1160.

Figure 13:
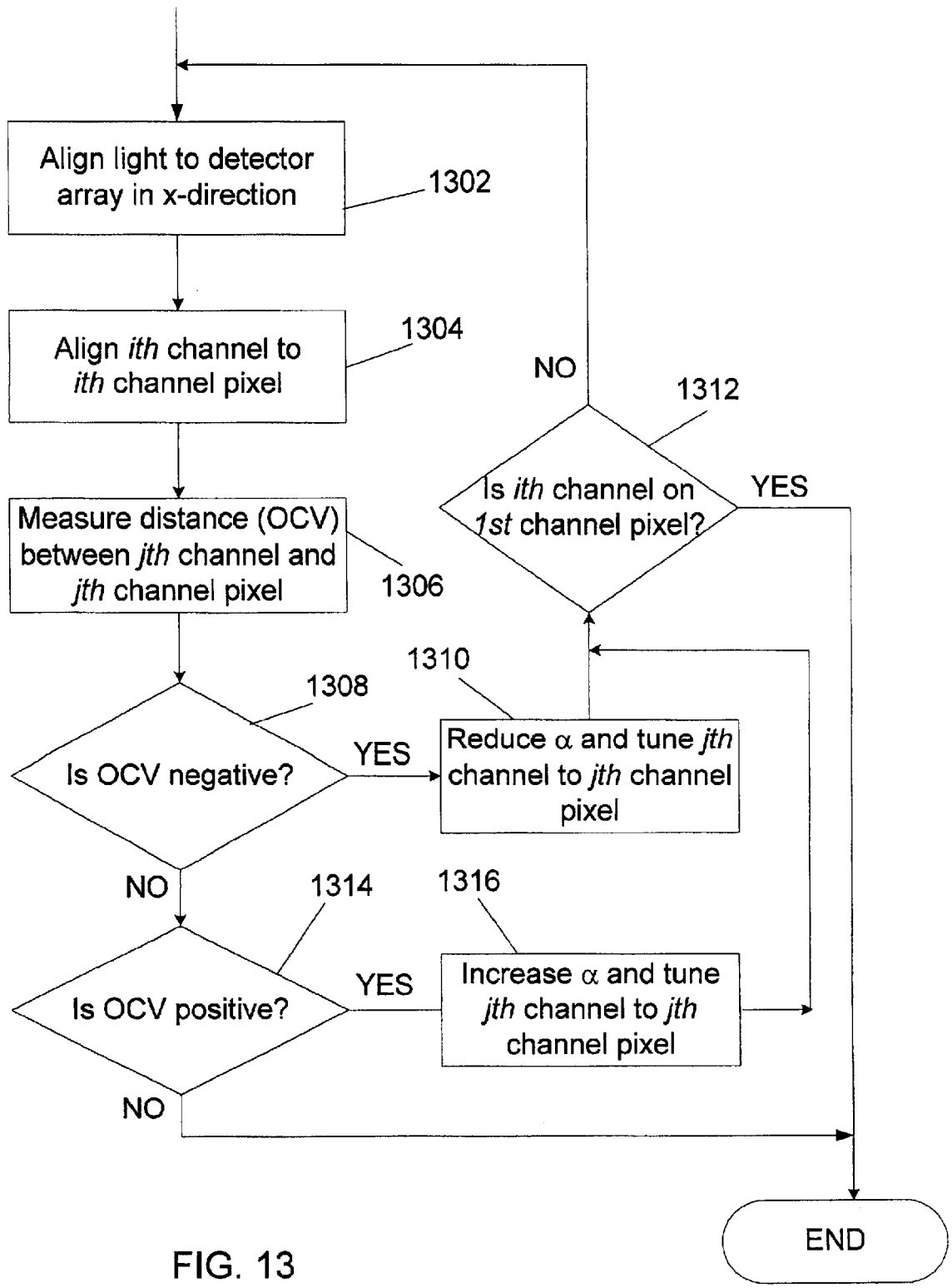
FIG. 13 lists method steps for aligning a diffractive WDM device according to an embodiment of the present invention.

One particular embodiment of a method for aligning the input unit so as to obtain the desired channel separation at the dispersion region is illustrated in flow-chart form in FIG. 13. First, at step 1302, the light is aligned on the detector array 1146 in the x-direction by, for example, translating the detector array 1146 in the x-direction using the screws 1154 or by translating the cylindrical lens 1142 in the x-direction. Next, at step 1304, one of the optical channels, termed the ith channel, is aligned to the pixel at which the ith channel is expected to be detected on the detector array 1146. This pixel is termed the ith channel pixel. The alignment may be made by translating the detector array 1146 in the positive or negative y-direction.

Next, at step 1306, the distance is measured between another channel, termed the jth channel, which is lower than the ith channel, and the pixel at which the jth channel is expected to be detected, also known as the jth channel pixel. This may be measured, for example, by detecting which pixel is illuminated by the jth channel. The difference between the expected and measured positions of the jth channel is termed OCV (optical channel variation). OCV is negative if the jth optical channel is positioned closer to the ith channel pixel than the jth channel pixel, and is positive if the jth optical channel is positioned farther away from the ith channel pixel than the jth channel pixel.

If OCV is negative, as determined at step 1308, then the angle of incidence, $\alpha$, on the first diffracting element is reduced and the jth channel is aligned to the jth channel pixel by translating the detector array 1146 parallel to the y-axis, step 1310. If the ith channel is aligned to the ith channel pixel, as determined at step 1312, then the device is in alignment. If, however, the ith channel is not aligned to the ith channel pixel, then the procedure returns to step 1302 and is repeated.

If OCV is positive, as determined at step 1314, then the angle of incidence, $\alpha$, on the first diffracting element is increased and the jth channel is aligned to the jth channel pixel by translating the detector array 1146 parallel to the y-axis, step 1316. If the ith channel is aligned to the ith channel pixel, as determined at step 1312, then the device is in alignment. If, however, the ith channel is not aligned to the ith channel pixel, then the procedure returns to step 1304 and is repeated.

If OCV is neither positive nor negative, then the device is in alignment and the alignment procedure is stopped. It will be appreciated that the ith and jth channels may be selected to be any of the respective optical channels, for example the uppermost and lowermost channels respectively. The channels selected for use in the alignment procedure advantageously have a relatively high power level for ease of alignment.

It will be appreciated that different modifications may be made to the devices and methods described herein. For example, the collimation unit 1110 may by set to the desired orientation by hand and then clamped in place. In another approach, the collimation unit 1110 may be pivoted about the pin 1126 by a screw pointing in the y-direction that pushes against a spring holding the collimation unit 1110 to the lower housing wall by providing tension in the -ve y-direction. After aligning the different channels, the collimation unit 1110 is clamped in place. The collimation unit 1110 may also be translated in the y-direction before or after setting α, so as to adjust the positions of the signals on the detector array 1146. The collimation unit 1110 may also be translated in the x-direction in order to align the optical signals on the detector in the x-direction.

Figure 11:
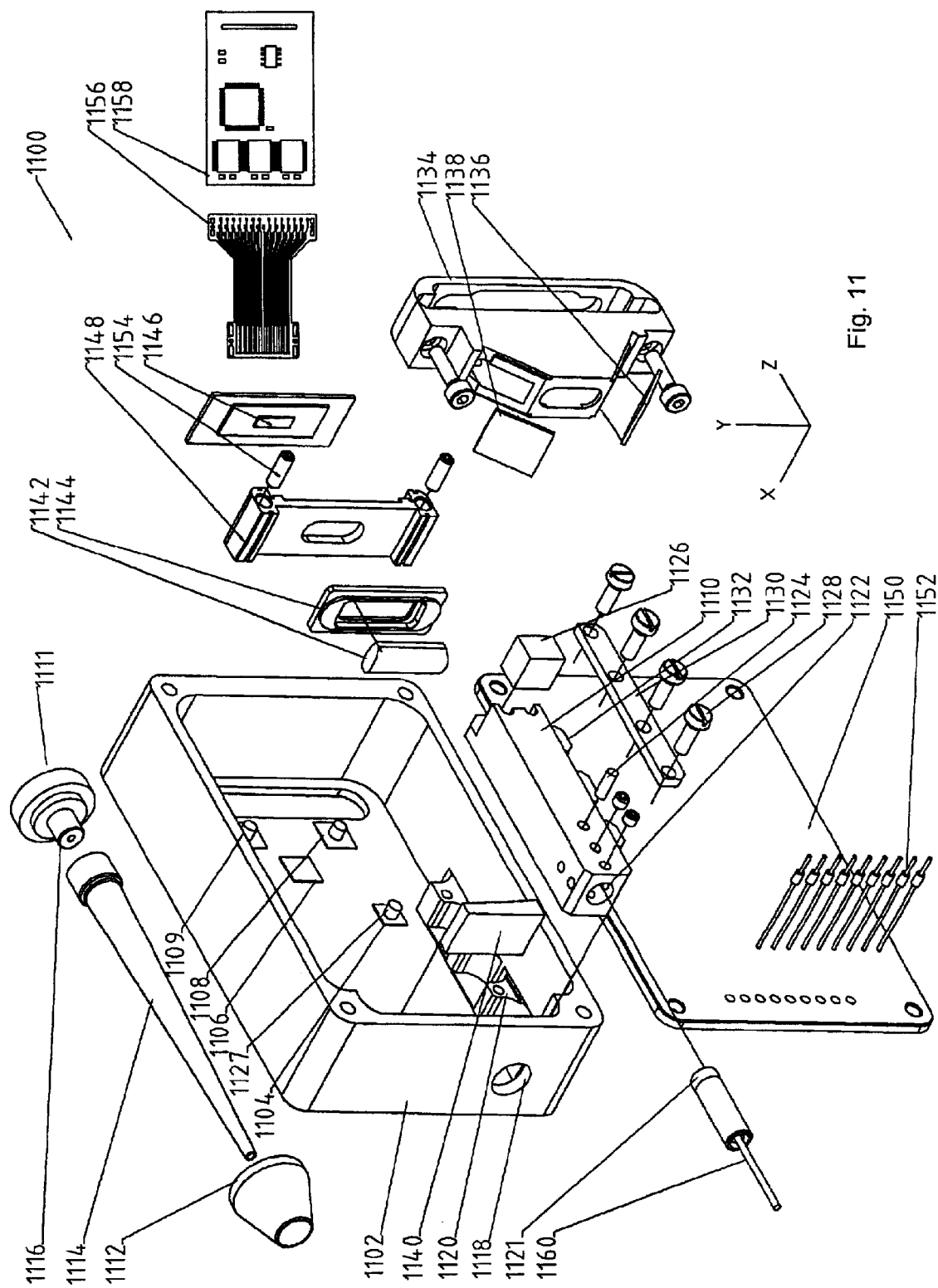
FIG. 11 schematically illustrates a diffractive WDM device according to an embodiment of the present invention.

It will also be appreciated that the type of housing described in FIG. 11 with regard to a WDM monitor may also be employed for other types of device such as MUX/DMUX, optical add/drop multiplexer or gain flattening filter. The collimation unit, once oriented to align the optical channels with channels of the light handling device may be clamped in place with screws or may be fixed in place using some other method, such as fixing with epoxy. Although the invention has been described herein with reference to a diffractive device that includes two transmission diffractive elements, the invention is applicable to diffractive WDM devices that include different numbers of diffractive elements and also to diffractive WDM devices that include reflective diffractive elements.

The present invention is applicable to diffractive WDM devices and is believed to be particularly useful for providing the final alignment to diffractive WDM devices that are passively aligned in manufacture. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claimed:

1. A method of aligning a diffractive wavelength division multiplexing (WDM) device that includes i) a multi-channel, light handling device having a selected channel spacing and ii) a multi-channel signal input unit, the method comprising:
    adjusting a direction of incidence of an optical signal from the input unit on at least a first diffracting element of the WDM device so as to set an actual optical channel spacing at an output region of the WDM device to be approximately equal to the selected channel spacing of the multi-channel, light handling device.

2. A method as recited in claim 1, wherein adjusting the direction of incidence of the optical signal includes orienting the input unit includes rotating the input unit about a rotation axis of an input unit collimating lens, the rotation axis being perpendicular to a direction of light propagation through the collimating lens.

3. A method as recited in claim 1, wherein adjusting the direction of incidence of the optical signal orienting the input unit includes rotating the input unit about an exit face of a multichannel input fiber coupled to an input of the input unit.

4. A method as recited in claim 1, wherein the input unit has a longitudinal axis and adjusting the direction of incidence of the optical signal unit includes rotating the collimator unit about a point on the longitudinal axis of the collimator unit.

5. A method as recited in claim 1, further comprising translating the multichannel, light handling device in a direction parallel to a diffraction plane of the diffractive WDM device.

6. A method as recited in claim 1, further comprising translating the multichannel, light handling device in a direction perpendicular to a diffraction plane of the diffractive WDM device.

7. A method as recited in claim 1, further comprising translating the input unit in a direction parallel to a diffraction plane of the diffractive WDM device.

8. A method as recited in claim 1, further comprising translating the input unit in a direction perpendicular to a diffraction plane of the diffractive WDM device.

9. A method as recited in claim 1, further comprising aligning a first channel signal to a first output channel of the multi-channel, light handling device, measuring a distance between an Nth channel signal and an Nth channel of the multi-channel, light handling device, and orienting the input unit to align the Nth channel signal to the Nth channel of the multi-channel, light handling device.

10. A method as recited in claim 1, further comprising diffracting the optical signal from the input unit using at least one transmissive diffracting element so as to separate optical channels at the output region of the WDM device.

11. A method as recited in claim 1, further comprising
    i) aligning a first channel signal to a first channel of the multichannel, light handling device,
    ii) measuring a separation between an Nth channel signal and a corresponding Nth channel of the multi-channel, light handling device,
    iii) orienting the input unit to align the Nth channel signal to the Nth channel of the multi-channel, light handling device,
    iv) checking that the first channel signal is aligned to the first channel of the multi-channel, light handling device, and
    v) repeating steps i) to iv) if the first channel signal is not aligned to the first channel output of the multi-channel, light handling device.

12. A diffractive WDM device, comprising;
    inputting means for inputting light to the diffractive WDM device;
    at least a first light diffracting means for diffracting light received from the inputting means;
    multi-channel light handling means for handling a multi-channel signal received from the at least a first light diffracting means, the multi-channel light handling means having a selected channel spacing; and
    adjusting means for adjusting a direction of incidence of an optical signal from the inputting means on the at least a first diffracting means so as to set an actual optical channel spacing at an output region of the diffractive WDM device to be approximately equal to the selected channel spacing of the multi-channel, light handling means.

13. A device as recited in claim 12, wherein the adjusting means includes means for adjusting orientation of the input means in a direction parallel to a diffraction plane of the diffractive WDM device.

14. A device as recited in claim 12, further comprising first translating means for translating one of the inputting means and the multi-channel light handling means relative to the other of the inputting means and the multi-channel light handling means in a direction parallel to a diffraction plane of the diffractive WDM device.

15. A diffractive WDM device as recited in claim 12, further comprising second translating means for translating one of the inputting means and the multi-channel light handling means relative to the other of the inputting means and the multi-channel light handling means in a direction perpendicular to a diffraction plane of the diffractive WDM device.

16. A diffractive WDM device, comprising;
   a light input unit for inputting a multi-channel optical signal;
   at least one diffracting element;
   a multi-channel, light handling device disposed to receive light from the at least one diffracting element, the multi-channel light handling device having a selected channel spacing; and
   at least one focusing element to focus light from the at least one diffracting element to the multi-channel, light handling device;
   wherein an orientation of the light input unit is adjustable in a direction parallel to a diffraction plane of the diffractive WDM device so as to select an actual channel spacing at the multi-channel, light handling device that is approximately equal to the selected channel spacing.

17. A diffractive WDM device as recited in claim 16, wherein the light input unit includes a fiber for coupling light into the diffractive WDM device.

18. A diffractive WDM device as recited in claim 17, wherein the light input unit further includes one or more lenses for collimating light exiting from an output end of the fiber.

19. A diffractive WDM device as recited in claim 18, wherein at least one of the lenses is a spherical lens.

20. A diffractive WDM device as recited in claim 18, wherein at least one of the lenses is a cylindrical lens.

21. A diffractive WDM device as recited in claim 18, wherein the light input unit includes a first lens disposed to reduce divergence of light exiting from the fiber, a polarization splitter disposed to split polarization of light received from the first lens into first and second beams having orthogonal polarization states and a polarization rotator disposed to rotate polarization of the first beam so as to be approximately parallel to polarization of the second beam.

22. A diffractive WDM device as recited in claim 21, further comprising at least one collimating lens to collimate the first and second beams.

23. A diffractive WDM device as recited in claim 21, further comprising at a first cylindrical collimating lens to collimate the first and second beams in a first direction and a second cylindrical lens to collimate the first and second beams in a second direction.

24. A diffractive WDM device as recited in claim 16, wherein the at least one diffracting element includes a transmissive diffracting element.

25. A diffractive WDM device as recited in claim 16, wherein the at least one diffracting element includes two or more diffracting elements in series between the input unit and the at least one focusing element.

26. A diffractive WDM device as recited in claim 16, wherein the at least one focusing element includes a reflecting focusing element to focus separated optical channels from the at least one diffracting element to the multi-channel, light handling device.

27. A diffractive WDM device as recited in claim 26, wherein the reflecting focusing element is aspheric.

28. A diffractive WDM device as recited in claim 26, further comprising a cylindrical lens disposed between the reflecting focusing element and the multi-channel, light handling device for focusing light in a direction perpendicular to a diffraction plane of the diffractive WDM device.

29. A diffractive WDM device as recited in claim 26, wherein the at least one focusing element further includes a lens array disposed between the reflecting focusing element and the multi-channel, light handling device to focus individual optical channels to respective channel segments of the light handling device.

30. A diffractive WDM device as recited in claim 16, wherein the multi-channel, light handling device includes a fiber array.

31. A diffractive WDM device as recited in claim 16, wherein the multi-channel, light handling device includes a detector array.

32. A diffractive WDM device as recited in claim 16, wherein the multi-channel, light handling device includes an optical switch array.

33. A diffractive WDM device as recited in claim 16, wherein the multi-channel, light handling device includes a multi-channel gain flattening filter device.

34. A diffractive WDM device as recited in claim 16, further comprising a screw adjustment for adjusting an orientation of the light input unit.

* * * * *

UNITED STATES PATENT AND TRADEMARK OFFICE
CERTIFICATE OF CORRECTION

PATENT NO. : 6,842,239 B2
DATED : January 11, 2005
INVENTOR(S) : Jens Bastue et al.

It is certified that error appears in the above-identified patent and that said Letters Patent is hereby corrected as shown below:

Drawings,
Sheet 11, Fig. 13, within the block 1312, the text "Is ith channel on 1st channel pixel?" should be changed to -- Is ith channel on ith channel pixel? --.

Signed and Sealed this

Thirty-first Day of May, 2005

JON W. DUDAS
*Director of the United States Patent and Trademark Office*